C. H. TAYLOR.
SINGLE DRUM WINCH.
APPLICATION FILED JULY 29, 1918.

1,316,927.

Patented Sept. 23, 1919.

Inventor
Charles H. Taylor
By
Strong & Townsend
Attorneys

UNITED STATES PATENT OFFICE.

CHARLES HENRY TAYLOR, OF GRASS VALLEY, CALIFORNIA.

SINGLE-DRUM WINCH.

1,316,927.  Specification of Letters Patent.  Patented Sept. 23, 1919.

Application filed July 29, 1918. Serial No. 247,093.

*To all whom it may concern:*

Be it known that I, CHARLES HENRY TAYLOR, a citizen of the United States, residing at Grass Valley, in the county of Nevada and State of California, have invented new and useful Improvements in Single-Drum Winches, of which the following is a specification.

This invention relates to a single drum winch, and particularly to a novel gear transmission for transmitting power thereto.

One of the objects of the present invention is to provide a simple form of reducing gear through which power may be transmitted to drive a single drum winch.

Another object of the invention is to provide gears and driving pinions of equal pitch to permit slipping of the gears into and out of mesh, and also to permit a single and a double reduction drive or vice versa to be transmitted to the drum.

Another object of the invention is to provide means for locking the gears with relation to each other to support a load on the winch, and to maintain the gears stationary when changing or shifting of the gears takes place. Further objects will hereinafter appear.

The invention consists of the parts and the construction and combination of parts as hereinafter more fully described and claimed, having reference to the accompanying drawings in which—

Figure 1:
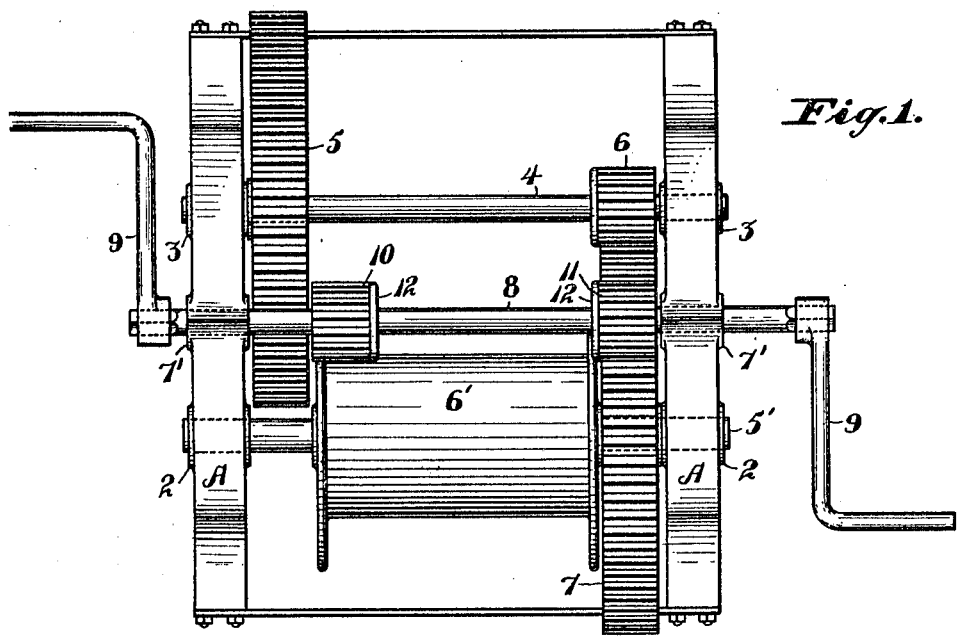
Figure 1 is a front view of the winch and the gear transmission employed.
Figure 2:
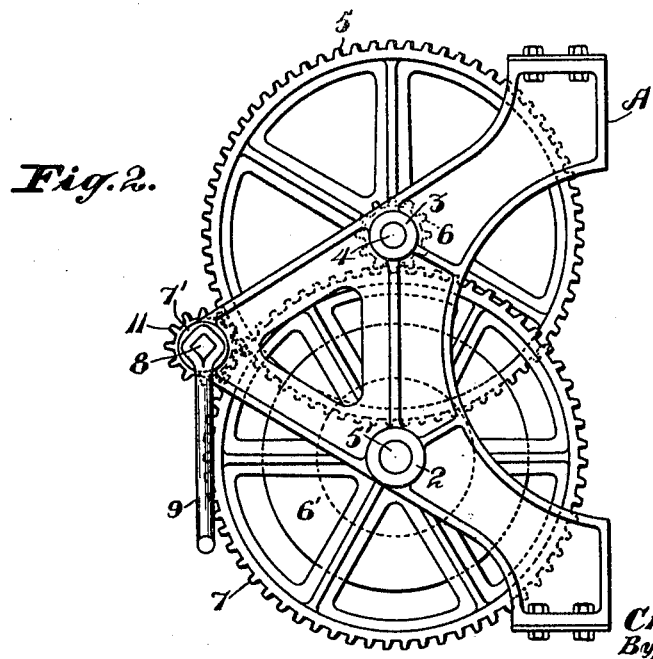
Fig. 2 is a side elevation of the same.

Referring to the drawings in detail, A indicates a pair of side frames of suitable construction in which are formed bearings as shown at 2 and 3. The bearings formed are alined and the upper bearings serve as a support for shaft 4, upon which is secured a large spur 5 and a small driving pinion 6. Similarly supported in the lower bearings 2 is a shaft 5', upon which is secured a winch drum 6' and a large driving gear 7, which remains in constant mesh with the driving pinion 6. Also formed on the side frames A forward of the bearings 2 and 3, and centrally between the same is a pair of alined bearings 7', and slidably mounted in said bearings is a shaft 8, on the opposite ends of which are secured crank arms 9. Rigidly secured on the shaft 8 are a pair of driving pinions 10 and 11, on the inner face of which are formed stop collars 12. The spacing between the pinions 10 and 11 is such that when the pinion 11 meshes with the gear 7, pinion 10 will be entirely out of mesh with the gear 5. The face of all the gears, however, is such that the pinions 10 and 11 may be meshed both with the gears 5 and 7 to form a lock between the same, as will hereinafter be described.

In actual operation, if it is desired to lift a load by means of a cable wound about the drum 6', it is possible to revolve the drum by turning the shaft 8 by means of the handles 9 when the pinions 10 and 11 assume the position shown in Fig. 1. A single gear reduction is here provided, inasmuch as the entire drive will be transmitted through the pinion 11 and the gear 7 to revolve the drum. If the load is too heavy for the reduction here shown, it is possible to double the reduction by sliding the shaft 8 longitudinally in the bearings 7 until the gear 11 moves entirely out of mesh with the gear 7 and the pinion 10 into mesh with the gear 5, when the power will be transmitted from the shaft 8 and pinion 10 to revolve the gear 5 and the shaft 4, and, as the pinion 6 is secured on this shaft and constantly intermeshes with the gear 7, it can readily be seen that revolving movement of the shaft 4 will be transmitted through the pinion 6 and the gear 7 to revolve the shaft 5' and the drum 6'.

A comparatively heavy load may, in this manner, be lifted with comparatively little effort on the part of the men operating the winch. Again if it is desired to support the load, whether lifting it through the single gear reduction or the double gear reduction shown, it can be accomplished by merely sliding the shaft 8 until the gears 10 and 11 partly mesh with their respective gears 5 and 7. Intermeshing of the gears in this manner produces a lock between the gears, and, therefore, permits supporting of the load at any point, or, at any time desired.

One important feature to be considered is that the pitch of the pinions and the gears, together with the pitch of the teeth, should be equal, as it would otherwise be impossible to move one set of gears into or out of mesh with another set. The pitch of the teeth is the important factor to be considered, but the pitch diameter may, of course, be increased or decreased, if desired, to produce any gear ratio required.

I similarly wish it understood that the materials and finish of the several parts employed may be such as the experience and judgment of the manufacturer may dictate.

Having thus described my invention, what I claim and desire to secure by Letters Patent is—

1. A winch comprising a frame, a shaft having a drum secured thereon journaled in said frame, a driving shaft journaled in the frame, an intermediate shaft journaled in the frame, a gear secured on the drum shaft, a pinion secured on the intermediate shaft intermeshing with said gear, a gear secured on the intermediate shaft, and a pair of pinion gears secured on the driving shaft, said driving shaft being shiftable to allow shifting of the driving pinions to permit the same to intermesh both with the gear on the drum shaft and with the gear on the intermediate shaft to permit locking of the gears and the drum against rotation.

2. A winch comprising a frame, a shaft journaled in the frame, having a drum secured thereon, an intermediate shaft journaled in the frame, a driving shaft journaled to enable same to be moved longitudinally in the frame, a pair of driving pinions secured on the driving shaft, a gear secured upon the intermediate shaft, a pinion secured upon the intermediate shaft, a gear secured upon the drum shaft adapted to constantly intermesh with the pinion on the intermediate shaft, and a crank arm secured on each end of the driving shaft for rotating the shaft and to permit said shaft to be moved longitudinally in the frame, said longitudinal movement of the driving shaft in one direction causing one of the driving pinions secured thereon to intermesh with the gear on the intermediate shaft when the opposite pinion is out of mesh with the gear on the drum shaft, and reverse movement of said shaft causing the pinion to move out of mesh with the gear on the intermediate shaft, while the opposite pinion moves into mesh with the gear on the drum shaft, and a half-way movement of the driving shaft causing both driving pinions to intermesh with their respective gears.

3. In a winch, a frame, a shaft journaled in the frame and having a drum thereon, a gear on the shaft adjacent one end of the frame, an intermediate shaft journaled in the frame and having a gear thereon adjacent the opposite end of the frame, a pinion on the intermediate shaft meshed with the drum gear, and a driving shaft journaled in the frame and having a pair of pinions thereon one for meshing with the gear of the intermediate shaft and the other for meshing with the gear of the drum.

4. In a winch, a drum, a driving shaft having a pair of pinions thereon, a gear on the drum for meshing with one of the pinions, an intermediate shaft having a gear for meshing with the other pinion, and a pinion on the intermediate shaft in mesh with the drum gear, said driving shaft being shiftable to a position to allow both of its pinions to mesh with the gear of the drum and intermediate shaft so as to lock all of the parts against movement.

In testimony whereof I have hereunto set my hand in the presence of two subscribing witnesses.

CHARLES HENRY TAYLOR.

Witnesses:
ARTHUR M. ANGOVE,
RALPH M. SCANDLING.

Copies of this patent may be obtained for five cents each, by addressing the "Commissioner of Patents, Washington, D. C."